United States Patent
Sun et al.

(10) Patent No.: US 11,394,223 B2
(45) Date of Patent: Jul. 19, 2022

(54) CHARGING METHOD, ELECTRONIC EQUIPMENT, AND STORAGE MEDIUM

(71) Applicant: BEIJING XIAOMI MOBILE SOFTWARE CO., LTD., Beijing (CN)

(72) Inventors: Changyu Sun, Beijing (CN); Lingli Han, Beijing (CN); Yu Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 165 days.

(21) Appl. No.: 15/930,243

(22) Filed: May 12, 2020

(65) Prior Publication Data
US 2021/0126469 A1    Apr. 29, 2021

(30) Foreign Application Priority Data
Oct. 23, 2019 (CN) .......................... 201911011569.7

(51) Int. Cl.
*H02J 7/00* (2006.01)

(52) U.S. Cl.
CPC .......... *H02J 7/007* (2013.01); *H02J 7/00034* (2020.01); *H02J 7/0047* (2013.01); *H02J 7/0071* (2020.01)

(58) Field of Classification Search
CPC ........ H02J 7/007; H02J 7/0047; H02J 7/0071; H02J 7/00034
USPC ................. 320/114, 132, 134, 136, 137, 157
See application file for complete search history.

(56) References Cited

U.S. PATENT DOCUMENTS

| | | | |
|---|---|---|---|
| 2007/0287509 A1* | 12/2007 | Izumi | H02J 7/0068 455/573 |
| 2011/0018679 A1* | 1/2011 | Davis | H02J 7/0071 320/155 |
| 2014/0055087 A1* | 2/2014 | Causey | H02J 7/025 320/108 |
| 2016/0214500 A1* | 7/2016 | Kim | B60L 58/12 |
| 2016/0285302 A1 | 9/2016 | Causey et al. | |
| 2018/0081417 A1* | 3/2018 | Chan | G06F 1/329 |
| 2018/0145532 A1 | 5/2018 | Causey et al. | |
| 2019/0109483 A1 | 4/2019 | Huo et al. | |
| 2019/0123565 A1* | 4/2019 | Hsiao | H02J 7/0029 |
| 2019/0356155 A1 | 11/2019 | Causey et al. | |
| 2020/0201419 A1* | 6/2020 | Bikumala | G06F 1/3212 |

FOREIGN PATENT DOCUMENTS

| | | |
|---|---|---|
| CN | 103972967 A | 8/2014 |
| EP | 3454448 A1 | 3/2019 |

OTHER PUBLICATIONS

Extended European Search Report in the European Application No. 20177369.4, dated Sep. 4, 2020 (9p).

* cited by examiner

*Primary Examiner* — Edward Tso
*Assistant Examiner* — Aaron Piggush
(74) *Attorney, Agent, or Firm* — Arch & Lake LLP

(57) ABSTRACT

Predetermined information indicating an application scene in charging electronic equipment is determined. A target charging mode adapted to the application scene is selected from alternative charging modes based on the predetermined information. Each of the alternative charging modes corresponds to a distinct charging parameter. The electronic equipment is charged based on the target charging mode.

15 Claims, 6 Drawing Sheets

CHARGING METHOD, ELECTRONIC EQUIPMENT, AND STORAGE MEDIUM

CROSS-REFERENCE TO RELATED APPLICATIONS

This application is based on, and claims benefit of priority to, Chinese Application No. 201911011569.7 filed on Oct. 23, 2019. Disclosure of the Chinese Application is hereby incorporated by reference in its entirety.

BACKGROUND

At present, electronic equipment has an increasingly high requirement on battery endurance. An overly slow charging process may not meet a demand for a charging speed for charging electronic equipment. An overly fast charging process may result in a major damage to a battery, leading to very fast aging of the battery, greatly shortening a service life of electronic equipment.

SUMMARY

Embodiments herein provide a charging method, electronic equipment, and a storage medium.

According to a first aspect, a charging method includes: determining predetermined information indicating an application scene in charging electronic equipment; selecting, from alternative charging modes based on the predetermined information, a target charging mode adapted to the application scene, where each of the alternative charging modes corresponds to a distinct charging parameter; and charging the electronic equipment based on the target charging mode.

According to a second aspect, electronic equipment includes a processor and memory. The memory is adapted to store an instruction executable by the processor. The processor is adapted to, while running a computer service, implement the disclosed charging methods herein.

According to a third aspect, a non-transitory computer-readable storage medium has stored thereon an executable program which, when executed by a processor, implements the charging methods disclosed herein.

The above general description and detailed description below are but exemplary and explanatory, and do not limit the subject disclosure.

BRIEF DESCRIPTION OF THE ACCOMPANYING DRAWINGS

Drawings here are incorporated in and constitute part of the subject disclosure, illustrate embodiments according to the subject disclosure, and together with the subject disclosure, serve to explain the principle of the subject disclosure.

DETAILED DESCRIPTION

Figure 1:
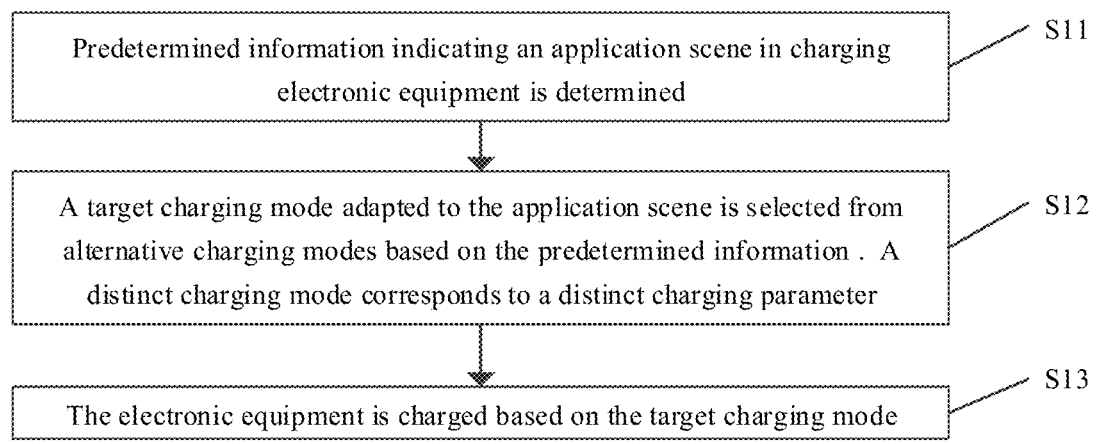
FIG. 1 is a flowchart of a charging method according to an example.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the device and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

FIG. 1 is a flowchart of a charging method according to an example. As shown in FIG. 1, the charging method may include following steps.

In S11, predetermined information indicating an application scene in charging electronic equipment is determined.

In S12, a target charging mode adapted to the application scene is selected from alternative charging modes based on the predetermined information. Among the alternative changing modes, each distinct charging mode corresponds to a distinct charging parameter.

In S13, the electronic equipment is charged based on the target charging mode.

The charging method may apply to charging equipment. The electronic equipment may be any rechargeable user equipment. For example, the electronic equipment may be mobile communication equipment, a smart watch, a smart wristband, a laptop, a tablet, etc.

The charging method may further apply to a charger. The electronic equipment may charge by establishing a communication connection with the charger.

The application scene may be a scene of running different applications (APP). For example, the electronic equipment may run an APP such as of taking a photo, using social network, a game etc. As another example, the electronic equipment may upgrade or download one or more APP, etc.

The application scene may be that of in a work state. For example, the electronic equipment may be in a sleep state. The electronic equipment may be in an awake state.

The application scene may be of being in a time period. For example, the electronic equipment may charge at some time in a time period from 9 o'clock in the morning to 12 o'clock at noon. The electronic equipment may charge at some time in a time period from 2 pm to 5 pm. The electronic equipment may charge at some time in a time period from 1 am to 3 am, etc.

The application scene may further be that current power of a Central Processing Unit (CPU) in electronic equipment falls within a threshold range. For example, current power may be greater than a first threshold. Alternatively, current power may be less than a first threshold.

The application scene may further include, but is not limited to, at least one scene such as when a screen is in a locked state or an unlocked state, when a screen s in a light-on state or a light-off state, etc.

The predetermined information may include, but is not limited to, power remaining in the electronic equipment at charging.

The predetermined information may include, but is not limited to, power consumed by the electronic equipment at charging.

The predetermined information may include, but is not limited to, a number of applications (APP) opened on the electronic equipment at charging;

The predetermined information may include, but is not limited to, a type of an APP opened on the electronic equipment at charging;

The predetermined information may include, but is not limited to, a time of charging the electronic equipment.

The predetermined information may include, but is not limited to, current power of a CPU of the electronic equipment at charging.

The predetermined information may include, but is not limited to, power consumed for running an APP on the electronic equipment at charging.

The charging parameter may include at least one of charging current, charging voltage, charging rated power, a charging rate, etc. A charging rate may be current required to charge a battery to reach rated capacity of the battery within a specified period of time.

With embodiments herein, predetermined information indicating an application scene in charging electronic equipment is determined. A target charging mode adapted to the application scene is selected from alternative charging modes based on the predetermined information. A distinct charging mode of the alternative charging modes corresponds to a distinct charging parameter. Accordingly, a suitable charging mode for charging electronic equipment may be selected according to a distinct application scene. For example, in an application scene where power is consumed quickly, charging may be performed based on a fast charging mode. As another example, in an application scene where power is consumed slowly, charging may be performed based on a slow charging mode.

A target charging mode selected from alternative charging modes may have a charging rate suiting a current application scene.

Accordingly, with embodiments herein, a charging mode suiting an application scene may be selected according to predetermined information indicating the application scene, greatly decreasing loss brought about by fast charging to a battery and improving a battery life while ensuring a charging speed. In addition, with embodiments herein, a suitable target charging mode may be selected automatically according to predetermined information, thereby increasing a degree of smartness of electronic equipment.

The alternative charging modes may include at least a first charging mode and a second charging mode. The application scene may include at least a first scene and a second scene.

Figure 2:
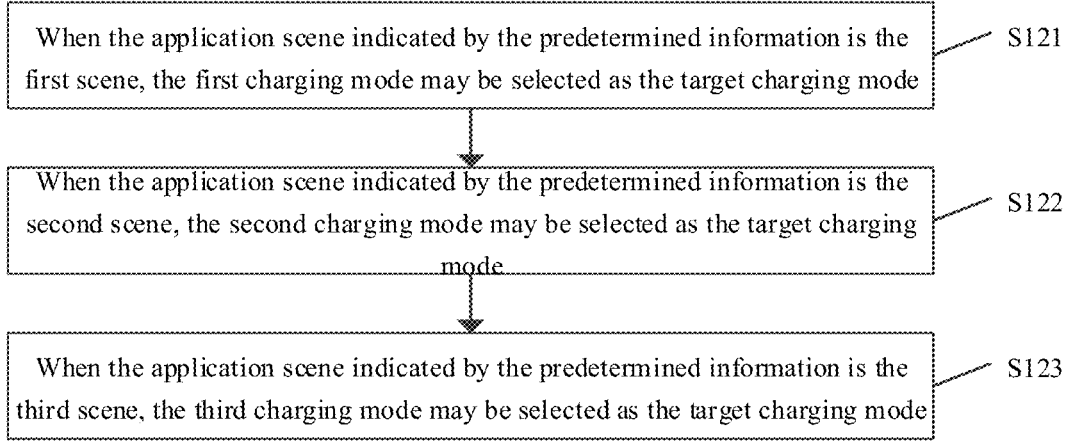
FIG. 2 is a flowchart of a charging method according to an example.

As shown in FIG. 2, S12 may include following steps.

In S121, when the application scene indicated by the predetermined information is the first scene, the first charging mode may be selected as the target charging mode.

In S122, when the application scene indicated by the predetermined information is the second scene, the second charging mode may be selected as the target charging mode.

If the first scene is that of being in a time period of 8:00-20:00 or any sub time period in 8:00-20:00, then the second scene is that of being in a time period of 20:00-8:00 or any sub time period in 20:00-8:00.

If the first scene is a power consuming scene such as that of taking a photo, video recording, playing a game, etc., then the second scene may be a scene where less power is consumed, such as in using social network applications, reading books, or browsing webpages, etc.

If the first scene is of running multiple APPs, then the second scene may be of running one APP.

A form of the first scene and the second scene is not limited here, as long as a power demand in the first scene is greater than a power demand in the second scene.

A charging rate corresponding to the first charging mode may be greater than a charging rate corresponding to the second charging mode.

A current power demand in the first scene may be greater than a current power demand in the second scene.

The first charging mode may be a fast charging mode. The second charging mode may be a slow charging mode.

A fast charging mode may include, but is not limited to, one of a fast charging mode 1 or a fast charging mode 2. In the fast charging mode 1, charging current may be greater than a preset current threshold. In the fast charging mode 2, charging voltage may be greater than a preset voltage threshold. For example, the fast charging mode 1 may correspond to high-rate charging. The fast charging mode 2 may correspond to high-voltage charging. In high-rate charging, a charging rate may be greater than 1 C. For example, for a battery of 4000 mAh, 1 C=4000 mA. The first charging mode may correspond to a charging rate of 2.5 C. 2.5 C=2.5×4000 mA=10 A. In high-voltage charging, charging cut-off voltage may be increased. For example, in the fast charging mode 2, charging cut-off voltage may be increased from 4.45V to 4.48V, and charging cut-off current may be increased from 200 mA to 700 mA.

A slow charging mode may include, but is not limited to, one of a slow charging mode 1 or a slow charging mode 2. In the slow charging mode 1, charging current may be less than a preset current threshold. In the slow charging mode 2, charging voltage may be less than a preset voltage threshold. For example, the slow charging mode 1 may be low-rate charging. The slow charging mode 2 may be low-voltage charging. In low-rate charging, a charging rate may be no greater than 0.5 C. For example, for a battery of 4000 mAh, 1 C=4000 mA. The first charging mode may correspond to a charging rate of 0.5 C. 0.5 C=0.5×4000 mA=2 A. In low-voltage charging, charging cut-off voltage may be decreased or constant. For example, in the second charging mode, charging cut-off voltage may be decreased from 4.45V to 4.25V.

Figure 3:
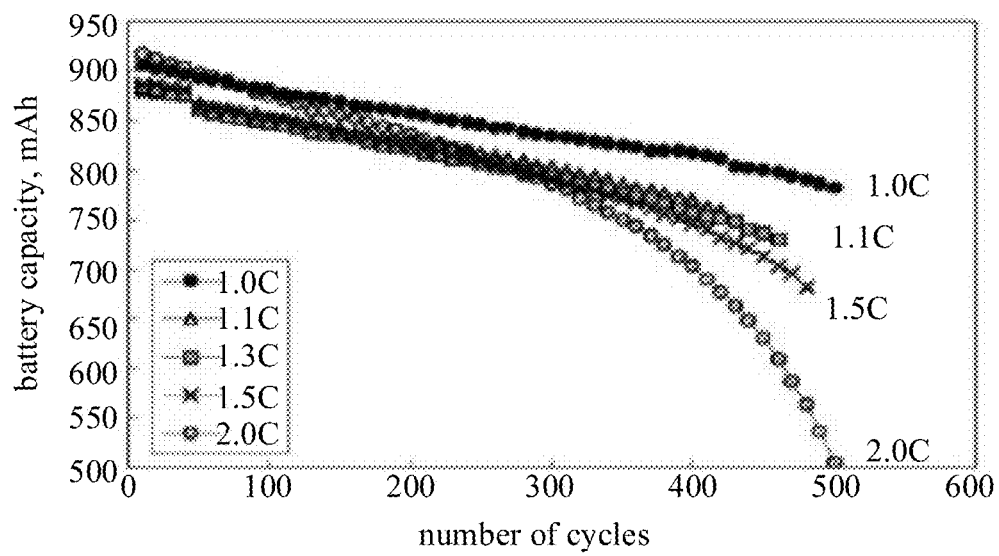
FIG. 3 is a block diagram of impact of a distinct charging rate on battery loss according to an example.

Exemplarily, FIG. 3 shows a diagram of impact of a distinct charging rate on battery loss. FIG. 3 shows respective losses of battery capacity after 500 charging cycles using charging rates of 1.0 C, 1.1 C, 1.5 C, and 2.0 C. Most loss may occur when a charging rate 2.0 C is used, where nearly half of capacity of the battery may be lost. Least loss may occur when a charging rate 1.0 C is used, where capacity of the battery may be lost by nearly 150 mAh.

Figure 4:
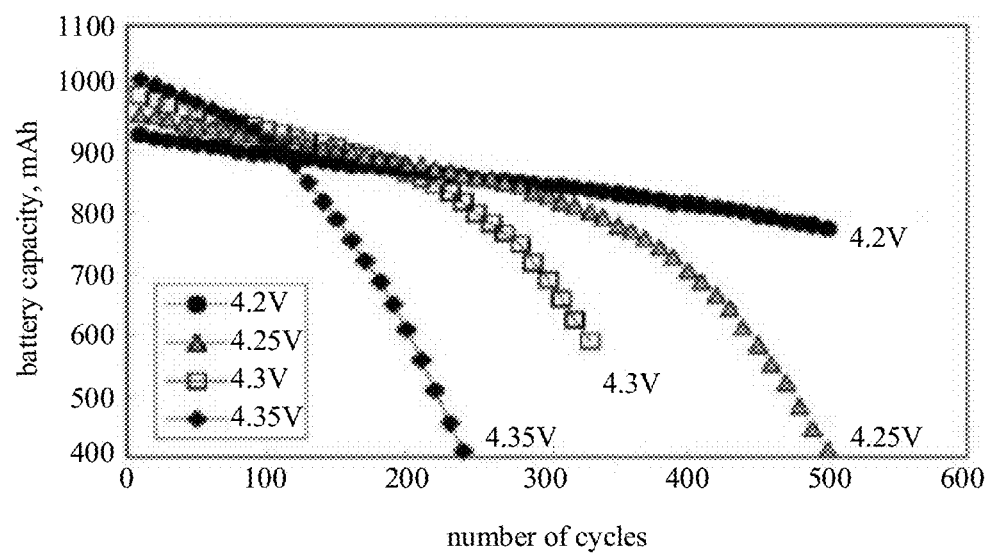
FIG. 4 is a block diagram of impact of a distinct charging voltage on battery loss according to an example.

Exemplarily, FIG. 4 shows a diagram of impact a distinct charging voltage on battery loss. FIG. 4 shows respective losses of battery capacity after a number of charging cycles using charging voltages 4.2V, 4.25V, 4.3V, and 4.35V. Capacity of the battery may be lost by but about 100 mAh after 500 charging cycles using charging voltage 4.2V. Capacity of the battery may be lost by about 550 mAh after 500 charging cycles using charging voltage 4.25V. Capacity of the battery may be lost by about 500 mAh after 380 charging cycles using charging voltage 4.3V. Capacity of the battery may be lost by about 500 mAh after just more than 250 charging cycles using charging voltage 4.35V.

Understandably, as shown in FIG. 3 or FIG. 4, the greater the charging rate, the greater the loss of battery capacity may be. The less the charging rate, the less the loss of battery capacity may be. The greater the charging voltage, the greater the loss of battery capacity may be. The less the charging voltage, the less the battery loss may be.

In related art, in general, to meet a demand of electronic equipment for a charging speed, the electronic equipment may be charged in a fast charging mode. Accordingly, after a number of charging cycles, major loss of capacity of a battery of the electronic equipment may occur, greatly shortening a battery life.

With embodiments herein, different target charging modes corresponding respectively to different application scenes may be used. A suitable target charging mode may be determined based on an application scene electronic equipment is in. The electronic equipment may be charged based on the suitable target charging mode. Furthermore, electronic equipment in a power consuming application scene may be charged using a fast charging mode (i.e., the first charging mode). As another example, electronic equipment in an application scene where less power is consumed may be charged using a slow charging mode (i.e., the second charging mode). Accordingly, accuracy in selecting a target charging mode may be further improved.

Accordingly, with embodiments herein, loss of battery capacity may be decreased and a battery life may be improved while ensuring a charging speed in charging electronic equipment. In addition, with embodiments herein, a charging mode for charging electronic equipment may be adjusted constantly according to a type of an application scene indicated by predetermined information, implementing smart electronic equipment.

The first charging mode and the second charging mode may further be other modes. For example, electronic equipment may be charged using charging current. Then, charging current corresponding to the first charging mode may be greater than charging current corresponding to the second charging mode. As another example, electronic equipment may be charged using charging voltage. Then, charging voltage corresponding to the first charging mode may be greater than charging voltage corresponding to the second charging mode. No limit is set herein.

The alternative charging modes may further include a third charging mode. A charging rate corresponding to the third charging mode may be between a charging rate corresponding to the first charging mode and a charging rate corresponding to the second charging mode. The application scene may further include a third scene. A power consumption demand in the third scene may be between a power consumption demand in the first scene and a power consumption demand in the second scene.

Step S1 may further include one or more steps below.

In S123, when the application scene indicated by the predetermined information is the third scene, the third charging mode may be selected as the target charging mode.

A third charging mode may further be set. The third charging mode may be a balanced charging mode. The balanced charging mode may correspond to a charging rate between a charging rate corresponding to a fast charging mode and a charging rate corresponding to a slow charging mode. The balanced charging mode may correspond to a third scene where a power demand may be between a power demand in the first scene and a power demand in the second scene.

Accordingly, with embodiments herein, charging may be performed using a moderate charging speed, retaining both a fast charging speed as with the first charging mode and less battery loss as with the second charging mode, leading to a better charging result. In addition, more target charging modes for charging electronic equipment may be included, such that more application scenes may be provided with matching charging modes.

A charging parameter corresponding to the third charging mode may be determined according to the first charging mode and a predetermined multiplier.

A charging parameter corresponding to the third charging mode may be determined by performing weighted average over a charging parameter corresponding to the first charging mode and a charging parameter corresponding to the second charging mode using a preset weighting coefficient.

A charging parameter corresponding to the third charging mode may be determined as follows.

A pair of charging parameters corresponding to the third charging mode may be determined based on a product of a charging parameter corresponding to the first charging mode and a multiplier.

The multiplier may be any value between 0 and 1. For example, the charging parameter may be charging current. Then, current determined by multiplying charging current meeting the first charging mode by the multiplier may be greater than charging current meeting the second charging mode. As another example, the charging parameter may be charging voltage. Then, voltage determined by multiplying charging voltage meeting the first charging mode by the multiplier may be greater than charging voltage meeting the second charging mode.

The multiplier may further include a charging rate.

For example, the first charging mode may correspond to a charging rate greater than 1 C. The second charging mode may correspond to a charging rate less than 0.5 C. The third charging mode may correspond to a charging rate greater than 0.5 C but less than 1 C.

The multiplier may be in another form, as long as a charging speed corresponding to the third charging mode is between a charging speed corresponding to the first charging mode and a charging speed corresponding to the second charging mode. No limit is set herein.

A charging parameter corresponding to the third charging mode may be determined as follows.

A charging parameter corresponding to the third charging mode may be computed. A charging parameter corresponding to the third charging mode $$C_3 = \frac{C_1 \times k_1 + C_2 \times k_2}{k_1 + k_2}.$$

The $C_1$ may be a charging parameter corresponding to the first charging mode. The $k_1$ may be a weighting coefficient of the first charging mode, which may be a first percentage.

The $C_2$ may be a charging parameter corresponding to the second charging mode. The $k_2$ may be a weighting coefficient of the second charging mode, which may be a second percentage.

A sum of the first percentage $k_1$ and the second percentage $k_2$ may be 1.

With embodiments herein, a charging parameter of a balanced charging mode (i.e., the third charging mode) may be deployed according to a charging parameter corresponding to fast charging (i.e., the first charging mode) and a charging parameter corresponding to slow charging (i.e., the second charging mode). A charging parameter corresponding to balanced charging may be acquired by configuring a ratio according to charging rates, charging current, charging voltage, etc., corresponding to a fast charging mode and a slow charging mode.

The application scene may be the first scene if the power consumed is greater than a first power threshold.

The application scene may be the second scene if the power consumed is less than a second power threshold. The first power threshold may be greater than the second power threshold.

The application scene may be a third scene if the power consumed is between the second power threshold and the first power threshold.

The power consumed may include power consumed by hardware of the electronic equipment and power consumed by software of the electronic equipment. Power consumed by hardware may include, but is not limited to, at least one of power consumed by a display, power consumed for standby, power consumed by a standby network signal, etc. Power consumed by software may include power consumed by an APP currently running on electronic equipment, such as power consumed by a browser, power consumed by social network app such as WECHAT®, power consumed by music playing app, power consumed by a calendar app, etc.

With embodiments herein, a type of an application scene may be determined based on power consumed by hardware and/or software of electronic equipment, etc. For example, a scene of taking a photo, video recording, playing a game, etc., may be determined as the first scene. A scene of music, video, etc., may be determined as the third scene. A scene of using social network applications and/or web browsing, etc., may be determined as the second scene. Accordingly, a suitable charging mode may be selected subsequently based on a distinct application scene.

The application scene may be the first scene if the time of charging is within a first time period.

The application scene may be the second scene if the time of charging is within a second time period.

A frequency of using the electronic equipment within the first time period may be greater than a frequency of using the electronic equipment within the second time period. A total duration of using the electronic equipment within the first time period may be greater than a total duration of using the electronic equipment within the second time period. An authorization to operate the electronic equipment within the first time period may be greater than an authorization to operate the electronic equipment within the second time period.

Time of charging may be current time when charging takes place. For example, time of charging may refer to uniform standard Beijing time. Time of charging may refer to synchronized time displayed by electronic equipment.

The first time period and the second time period may be default set on electronic equipment.

For example, the first time period may be 8:00-20:00. The second time period may be 20:00-8:00. Understandably, 8:00-20:00 may be working hours. A user may use electronic equipment frequently within the time period. Accordingly, 8:00-20:00 may be determined as the first scene, Thus, electronic equipment may be set to charge in a fast charging mode. 20:00-8:00 may be break hours. A user may use electronic equipment less frequently within the time period. Accordingly, 20:00-8:00 may be determined as the second scene. Thus, electronic equipment may be set to charge in a slow charging mode.

The first time period and the second time period may further be set by a user.

For example, it may be determined, based on a user behavior, that a user may use electronic equipment most frequently 9:00-11:00 in the morning. 9:00-11:00 may be determined as the first scene. It may be determined that the user may also use the electronic equipment frequently 20:00-22:00 in the evening. 20:00-22:00 may be determined as the third scene. It may be determined that the user may use the electronic equipment least frequently 1:00-5:00 early morning. 1:00-5:00 may be determined as the second scene.

As another example, in a practical application, the electronic equipment may be a smart learning machine. The user may be a first user. The first user may be a kid. It may be determined that the first user may have a greater authorization to operate the electronic equipment 21:00-23:00 in the evening than to operate the electronic equipment 8:00-18:00 during the day. Then, 21:00-23:00 may be determined as the first scene. 8:00-18:00 may be determined as the second scene.

In short, with embodiments herein, a type of an application scene of charging in a time period may be determined according to time of charging electronic equipment and based on a frequency and/or a duration the electronic equipment is used, and/or an authorization to operate the electronic equipment, etc., within the time period of charging. Accordingly, a target charging mode corresponding to an application scene determined may be determined subsequently based on a type of the application scene.

An application scene may be a first scene or a third scene if a screen of electronic equipment is in a light-on state. An application scene may be a second scene if a screen of electronic equipment is in a light-off state.

An application scene may be a first scene or a third scene if a screen of electronic equipment is in an unlocked state. An application scene may be a second scene if a screen of electronic equipment is in a locked state.

Understandably, when a screen of electronic equipment is in a light-off state or a locked state, the electronic equipment may consume less power. Then, it may be determined that an application scene may be a second scene. When a screen of electronic equipment is in a light-on state or an unlocked state, the electronic equipment may be power consuming. Then, it may be determined that an application scene may be a first scene or a third scene.

An application scene may be a first scene if a number of APPs greater than a third value are opened on electronic equipment. An application scene may be a second scene if a number of APPs less than a fourth threshold are opened on electronic equipment.

An application scene may be a third scene if a number of APPs between the fourth value and the third value are opened on electronic equipment.

Accordingly, a type of an application scene may be determined based further on a number of APPs opened (or running) on electronic equipment. Accordingly, a target charging mode corresponding to a type of a determined application scene may be determined.

A type of an application scene may be determined based further on a type of an APP opened (or running) on electronic equipment. A type of an APP may be determined based on power in an application scene.

S13 may include a step as below.

When power remaining in the electronic equipment is less than a third power threshold, the electronic equipment may be charged using constant current according to a constant-current charging parameter corresponding to the target charging mode.

When power remaining in the electronic equipment is no less than the third power threshold, the electronic equipment may be charged using constant voltage according to a constant-voltage charging parameter corresponding to the target charging mode.

The third power threshold may be 60% of battery capacity.

When power remaining in electronic equipment is low (i.e., less than the third power threshold), the electronic equipment may be charged using constant current (CC). During charging using the constant current, a charging rate (i.e., charging current) may be changed to switch among a first charging mode, a second charging mode, a third charging mode, etc.

For example, charging in a first charging mode may be implemented if electronic equipment is charged using a first charging rate, such as by setting a charging rate of 1.5 C, 2 C, 2.2 C, etc., thereby greatly shortening a charging duration for reaching a state of charge (SOC) of 60%, achieving fast charging.

As another example, charging in a second charging mode may be implemented if electronic equipment is charged using a second charging rate, such as by setting a charging rate of 0.5 C. Accordingly, a battery life may be improved in spite of a long time period of charging using CC.

The first charging rate may be greater than the second charging rate.

When more power (i.e., greater than the third power threshold) remains in electronic equipment, the electronic equipment may be charged using constant voltage (CV). During charging using constant voltage, a charging speed may change according to a voltage difference, an internal resistance, etc. Accordingly, switch among a first charging mode, a second charging mode, a third charging mode, etc., may be implemented by changing charging voltage.

For example, charging in a first charging mode may be implemented if electronic equipment is charged using first charging voltage, such as by increasing charging cut-off voltage from 4.45V to 4.49V. Accordingly, an amount of charge with which the electronic equipment would have been charged using CV may be shifted to a stage when the electronic equipment is charged with the amount using CC, thereby shortening a time period of charging using CV, achieving fast charging.

As another example, charging in a second charging mode may be implemented if electronic equipment is charged using second charging voltage, such as by decreasing charging cut-off voltage from 4.45V to 4.44V. Accordingly, the electronic equipment may be charged using low CV, extending a time period of charging, improving a battery life.

Electronic equipment may be charged in a third charging mode by adjusting a charging rate or charging current when charging using CC. Electronic equipment may be charged in a third charging mode by adjusting charging voltage when charging using CV. Accordingly, electronic equipment may be charged in a moderate working mode, maintaining a charging speed and improving a battery life.

Figure 5:
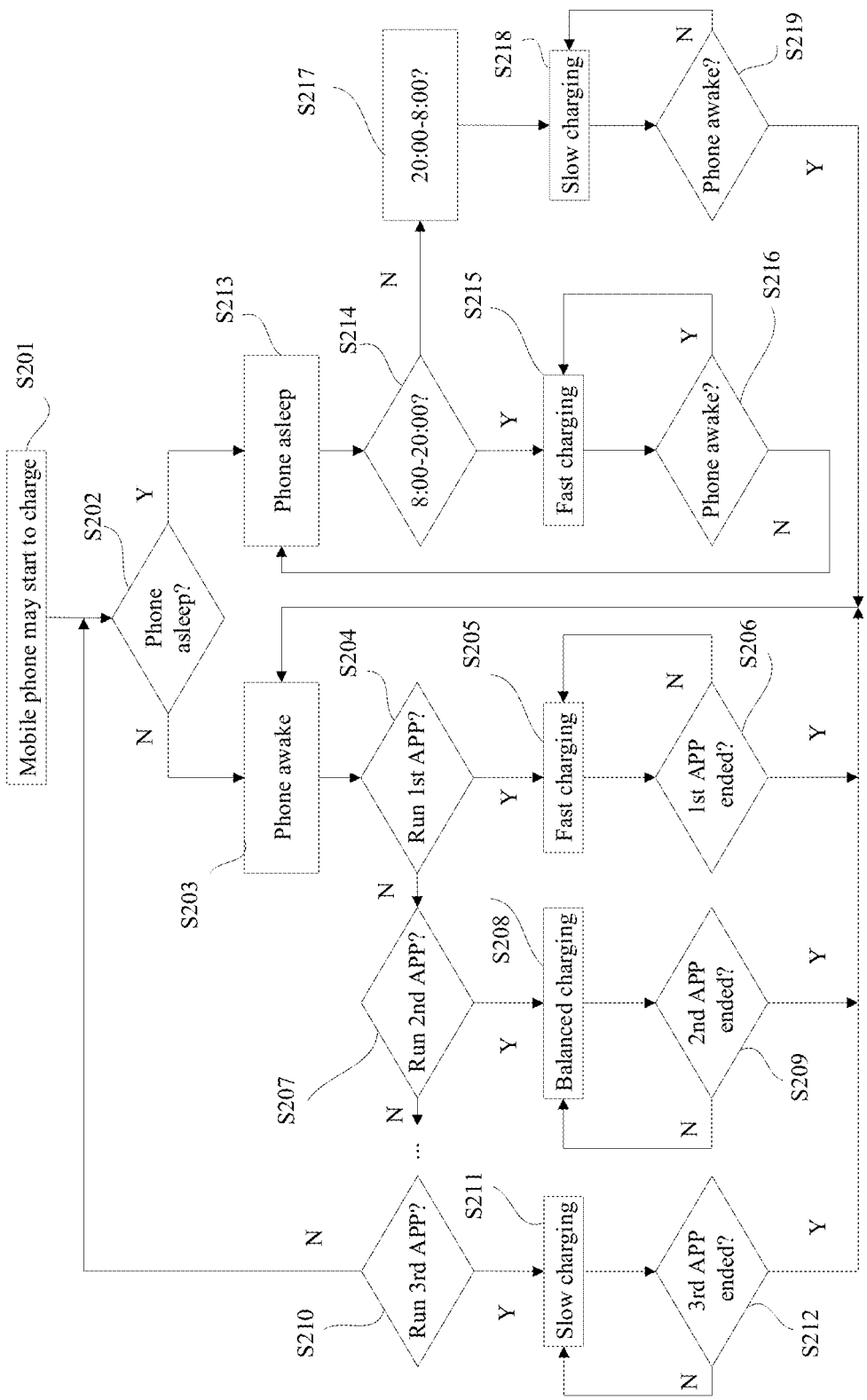
FIG. 5 is a flowchart of a charging method according to an example.

FIG. 5 is a flowchart of a charging method according to an example. As shown in FIG. 5, the charging method may apply to a mobile phone. The charging method may include following steps.

In S201, a mobile phone may start to charge.

In S202, it may be determined whether the mobile phone is in a sleep state. If it is not asleep, S203 may be performed. If it is asleep, S213 may be performed.

In S203, it may be determined that the mobile phone is in an awake state.

In S204, it may be determined whether an APP of a first class is run. If an APP of a first class is run, S205 may be performed. Otherwise, if no APP of a first class is run, S207 may be performed.

An APP of a first class may correspond to a first scene according to an embodiment herein. An APP of a first class may consume power greater than a first power threshold.

In S205, fast charging may be performed.

Fast charging may be a first charging mode according to an embodiment herein.

In S206, it may be determined whether the APP of the first class stops running. If the APP of the first class is still running, S205 may be performed. If the APP of the first class stops running, S203 may be performed.

In S207, it may be determined whether an APP of a second class is run. If an APP of a second class is run, S208 may be performed. Otherwise, if no APP of a second class is run, S210 may be performed.

An APP of a second class may correspond to a third scene according to an embodiment herein. An APP of a second class may consume power greater than a second power threshold and less than the first power threshold. The second power threshold may be less than the first power threshold.

In S208, balanced charging may be performed.

Balanced charging may be a third charging mode according to an embodiment herein.

In S209, it may be determined whether the APP of the second class stops running. If the APP of the second class is still running, S208 may be performed. Otherwise, if the APP of the second class stops running, S203 may be performed.

In S210, it may be determined whether an APP of a third class is run. If an APP of a third class is run, S211 may be performed. Otherwise, if no APP of a third class is run, S202 may be performed.

An APP of a third class may correspond to a second scene according to an embodiment herein. An APP of a third class may consume power less than the second power threshold.

In S211, slow charging may be performed.

Slow charging may be a second charging mode according to an embodiment herein.

In S212, it may be determined whether the APP of the third class stops running. If the APP of the third class is still running, S211 may be performed. Otherwise, if the APP of the third class stops running, S203 may be performed.

In S213, it may be determined that the mobile phone is in a sleep state.

In S214, it may be determined whether current time is in 8:00-20:00. If it is 8:00-20:00, S215 may be performed. Otherwise, if it is not 8:00-20:00, S217 may be performed.

Current time may be when the mobile phone is charged.

In S215, fast charging may be performed.

In S216, it may be determined whether the mobile phone is in an awake state. If the mobile phone is asleep, S213 may be performed. Otherwise, if the mobile phone is awake, S215 may be performed.

In S217, it may be determined whether current time is in 20:00-8:00.

In S218, slow charging may be performed.

In S219, it may be determined whether the mobile phone is in an awake state. If the mobile phone is not awake, S218 may be performed. If the mobile phone is awake, S203 may be performed.

First, a state of a mobile phone may be determined. If the mobile phone is in an awake state, a charging mode used for charging the mobile phone may be determined based on a type of an application scene corresponding to an APP being run by the mobile phone. If the mobile phone is in a sleep state, a charging mode used for charging the mobile phone may be determined according to current time when charging takes place.

When the mobile phone is in an awake state, if the mobile phone runs an APP of a first class (i.e., a power consuming APP), then fast charging may be performed. If the mobile phone runs an APP of a second class (i.e., an APP consuming moderate power), then balanced charging may be performed. That is, the mobile phone may be charged at a moderate speed. If the mobile phone runs an APP of a third class (i.e., an APP consuming less power), then slow charging may be performed. Accordingly, with embodiments herein, a mobile phone may be charged by selecting a suitable charging mode according to power consumed by the mobile phone when running a program, improving life of a battery of the mobile phone while ensuring a charging speed.

When a mobile phone is in a sleep state, if the mobile phone is charged during the day (i.e., 8:00-20:00), fast charging may be performed. If the mobile phone is charged during night (20:00-8:00), slow charging may be performed. Accordingly, with embodiments herein, a mobile phone may be charged by selecting a suitable charging mode according to current time and based on a frequency and/or time the mobile phone is used in the time period, etc., improving life of a battery of the mobile phone while ensuring a charging speed.

Figure 6:
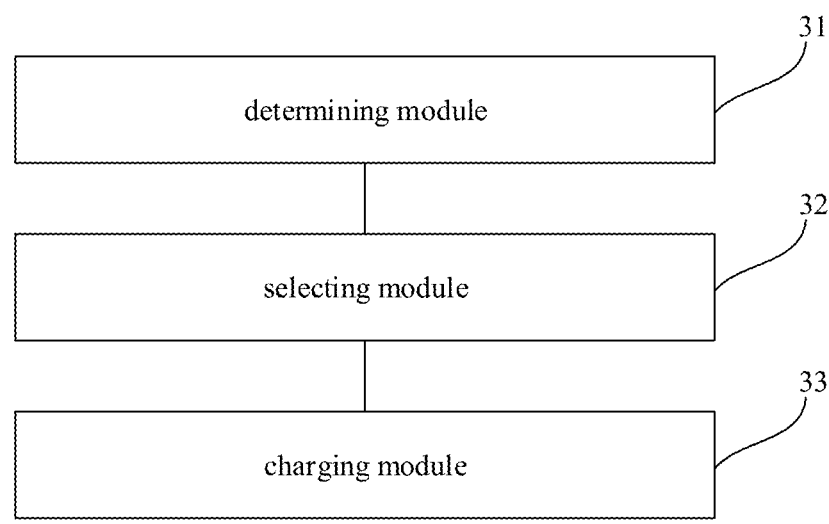
FIG. 6 is a block diagram of a charging device according to an example.

FIG. 6 is a block diagram of a charging device according to an example. Referring to FIG. 6, the device may include a determining module 31, a selecting module 32, and a charging module 33.

The determining module 31 may be adapted to determine predetermined information indicating an application scene in charging electronic equipment.

The selecting module 32 may be adapted to select, from alternative charging modes based on the predetermined information, a target charging mode adapted to the application scene. A distinct charging mode may correspond to a distinct charging parameter.

The charging module 33 may be adapted to instruct the electronic equipment to charge based on the target charging mode.

The alternative charging modes may include at least a first charging mode and a second charging mode. The application scene may include at least a first scene and a second scene.

The selecting module 32 may be adapted to, in response to the application scene indicated by the predetermined information being the first scene, select the first charging mode as the target charging mode. The selecting module may be adapted to, in response to the application scene indicated by the predetermined information being the second scene, select the second charging mode as the target charging mode.

A charging rate corresponding to the first charging mode may be greater than a charging rate corresponding to the second charging mode.

A current power demand in the first scene may be greater than a current power demand in the second scene.

The alternative charging modes may further include a third charging mode. A charging rate corresponding to the third charging mode may be between a charging rate corresponding to the first charging mode and a charging rate corresponding to the second charging mode. The application scene may further include a third scene. A power consumption demand in the third scene may be between a power consumption demand in the first scene and a power consumption demand in the second scene.

The selecting module 32 may further be adapted to, in response to the application scene indicated by the predetermined information being the third scene, select the third charging mode as the target charging mode.

A charging parameter corresponding to the third charging mode may be determined according to the first charging mode and a predetermined multiplier.

A charging parameter corresponding to the third charging mode may be determined by performing weighted average over a charging parameter corresponding to the first charging mode and a charging parameter corresponding to the second charging mode using a preset weighting coefficient.

The predetermined information may include power remaining in the electronic equipment at charging.

The predetermined information may include power consumed by the electronic equipment at charging.

The predetermined information may include a number of applications (APP) opened on the electronic equipment at charging.

The predetermined information may include a type of an APP opened on the electronic equipment at charging.

The predetermined information may include a time of charging the electronic equipment.

The predetermined information may include current power of a CPU of the electronic equipment at charging.

The predetermined information may include power consumed for running an APP on the electronic equipment at charging.

The application scene may be the first scene if the power consumed is greater than a first power threshold.

The application scene may be the second scene if the power consumed is less than a second power threshold. The first power threshold may be greater than the second power threshold.

The application scene may be a third scene if the power consumed is between the second power threshold and the first power threshold.

The application scene may be the first scene if the time of charging is within a first time period.

The application scene may be the second scene if the time of charging is within a second time period.

A frequency of using the electronic equipment within the first time period may be greater than a frequency of using the electronic equipment within the second time period. A duration of using the electronic equipment within the first time period may be greater than a duration of using the electronic equipment within the second time period. The duration may be the total duration of using the electronic equipment during that time period. An authorization to operate the electronic equipment within the first time period may be greater than an authorization to operate the electronic equipment within the second time period.

The charging module 33 may be adapted to, in response to power remaining in the electronic equipment being less than a third power threshold, instruct the electronic equipment to charge using constant current according to a constant-current charging parameter corresponding to the target charging mode.

The charging module may be adapted to, in response to power remaining in the electronic equipment being no less than the third power threshold, instruct the electronic equipment to charge using constant voltage according to a constant-voltage charging parameter corresponding to the target charging mode.

A module of the device according to at least one embodiment herein may execute an operation in a mode elaborated in at least one embodiment of the method herein, which will not be repeated here.

Electronic equipment may include a processor and memory.

The memory is adapted to store an instruction executable by the processor.

The processor is adapted to, while running a computer service, implementing the charging method according to one or more embodiments herein.

The memory may include various types of storage media. A storage medium may be a non-transitory computer storage medium capable of maintaining information stored thereon after communication equipment powers down.

The processor may be connected to the memory via a bus, etc. The processor may be adapted to read an executable program stored on the memory, such as at least one of methods shown in FIG. 1, FIG. 2, and FIG. 5.

A non-transitory computer-readable storage medium has stored thereon an executable program which, when executed by a processor, implements the charging method according to an embodiment herein, such as at least one of methods shown in FIG. 1, FIG. 2, and FIG. 5.

A module of the device according to at least one embodiment herein may execute an operation in a mode elaborated in at least one embodiment of the method herein, which will not be repeated here.

Figure 7:
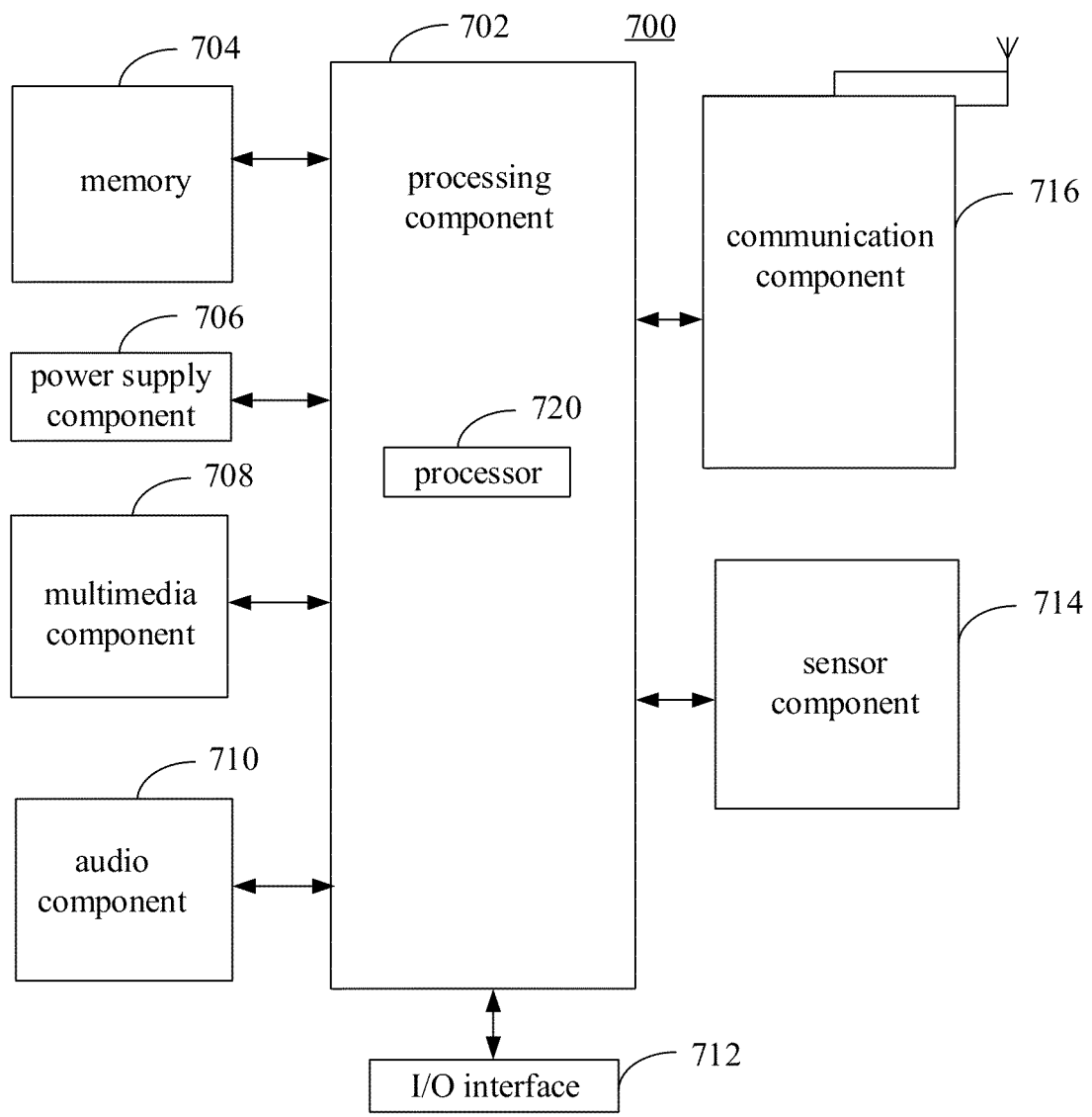
FIG. 7 is a block diagram of electronic equipment according to an example.

FIG. 7 is a block diagram of a charging device 700 according to an example. For example, the device 700 may be UE such as a mobile phone, a computer, digital broadcast UE, messaging equipment, a gaming console, tablet equipment, medical equipment, exercise equipment, a personal digital assistant, etc.

Referring to FIG. 7, the device 700 may include at least one of a processing component 702, memory 704, a power supply component 706, a multimedia component 708, an audio component 710, an Input/Output (I/O) interface 712, a sensor component 714, a communication component 716, etc.

The processing component 702 may generally control an overall operation of the device 700, such as operations associated with display, a telephone call, data communication, a camera operation, a recording operation, etc. The processing component 702 may include one or more processors 720 to execute instructions so as to complete all or a part of an aforementioned method. In addition, the processing component 702 may include one or more modules to facilitate interaction between the processing component 702 and other components. For example, the processing component 702 may include a multimedia portion to facilitate interaction between the multimedia component 708 and the processing component 702.

The memory 704 may be adapted to store various types of data to support the operation at the device 700. Examples of such data may include instructions of any application or method adapted to operate on the device 700, contact data, phonebook data, messages, pictures, videos, etc. The memory 704 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 706 may supply electric power to various components of the device 700. The power supply component 706 may include a power management system, one or more power sources, and other components related to generating, managing, and distributing electricity for the device 700.

The multimedia component 708 may include a screen that provides an output interface between the device 700 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 708 may include at least one of a front camera or a rear camera. When the device 700 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 710 may be adapted to output and/or input an audio signal. For example, the audio component 710 may include a microphone (MIC). When the device 700 is in an operation mode such as a call mode, a recording mode, a voice recognition mode, etc., the MIC may be adapted to receive an external audio signal. The received audio signal may be further stored in the memory 704 or may be sent via the communication component 716. The audio component 710 may further include a loudspeaker adapted to output the audio signal.

The I/O interface 712 may provide an interface between the processing component 702 and a peripheral interface portion. Such a peripheral interface portion may be a keypad, a click wheel, a button, etc. Such a button may include but is not limited to at least one of a homepage button, a volume button, a start button, or a lock button.

The sensor component 714 may include one or more sensors for assessing various states of the device 700. For example, the sensor component 714 may detect an on/off state of the device 700 and relative positioning of components such as the display and the keypad of the device 700. The sensor component 714 may further detect a change in the position of the device 700 or of a component of the device 700, whether there is contact between the device 700 and a user, the orientation or acceleration/deceleration of the device 700, a change in the temperature of the device 700, etc. The sensor component 714 may include a proximity sensor adapted to detect existence of a nearby object without physical contact. The sensor component 714 may further include an optical sensor such as a Complementary Metal-Oxide-Semiconductor (CMOS) or a Charge-Coupled-Device (CCD) image sensor used in an imaging application. The sensor component 714 may further include an acceleration sensor, a gyroscope sensor, a magnetic sensor, a pressure sensor, a temperature sensor, etc.

The communication component 716 may be adapted to facilitate wired or wireless communication between the device 700 and other equipment. The device 700 may access a wireless network based on a communication standard such as Wi-Fi, 2G, 3G . . . , or a combination thereof. The communication component 716 may broadcast related information or receive a broadcast signal from an external broadcast management system via a broadcast channel. The communication component 716 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The device 700 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

A non-transitory computer-readable storage medium including instructions, such as memory 704 including instructions, may be provided. The instructions may be executed by the processor 720 of the device 700 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Other embodiments according to the subject disclosure will be apparent to one skilled in the art after she or he has considered the subject disclosure and practiced the invention disclosed herein. The subject application is intended to cover any variation, use, or adaptation of the subject disclosure following the general principle of the subject disclosure and including such departures from the subject disclosure as come within knowledge or customary practice in the art. The specification and the embodiments are intended to be exemplary only, with a true scope and spirit of the subject disclosure being indicated by the appended claims.

The subject disclosure is not limited to the exact construction that has been described above and illustrated in the accompanying drawings. Various modifications and changes can be made without departing from the scope of the subject disclosure. It is intended that the scope of the subject disclosure be limited only by the appended claims.

What is claimed is:

1. A charging method, comprising:
   determining, by an electronic equipment, predetermined information indicating an application scene in charging the electronic equipment;
   selecting, from alternative charging modes based on the predetermined information, a target charging mode adapted to the application scene, wherein each of the alternative charging modes corresponds to a distinct charging parameter; and
   charging the electronic equipment based on the target charging mode,
   wherein the alternative charging modes comprise a first charging mode and a second charging mode, wherein the application scene comprises a first scene and a second scene,
   wherein selecting, based on the predetermined information from the alternative charging modes, the target charging mode adapted to the application scene comprises:
   in response to the application scene indicated by the predetermined information being the first scene, selecting the first charging mode as the target charging mode; and
   in response to the application scene indicated by the predetermined information being the second scene, selecting the second charging mode as the target charging mode,
   wherein the alternative charging modes further comprise a third charging mode, wherein a third charging rate corresponding to the third charging mode is between a first charging rate corresponding to the first charging mode and a second charging rate corresponding to the second charging mode, wherein the application scene further comprises a third scene, wherein a third power consumption demand in the third scene is between a first power consumption demand in the first scene and a second power consumption demand in the second scene,
   wherein selecting, based on the predetermined information from the alternative charging modes, the target charging mode adapted to the application scene comprises:
   in response to the application scene indicated by the predetermined information being the third scene, selecting the third charging mode as the target charging mode,
   wherein the charging method further comprises one of following acts:
   determining a charging parameter corresponding to the third charging mode according to the first charging mode and a predetermined multiplier, or
   determining the charging parameter corresponding to the third charging mode by performing weighted average over a charging parameter corresponding to the first charging mode and a charging parameter corresponding to the second charging mode using a preset weighting coefficient.

2. The charging method of claim 1, wherein the first charging mode has a first charging rate that is greater than a second charging rate corresponding to the second charging mode.

3. The charging method of claim 1, wherein the first scene has a first current power demand that is greater than a second current power demand in the second scene.

4. The charging method of claim 1, wherein the predetermined information comprises at least one of following parameters:
power remaining in the electronic equipment at charging;
power consumed by the electronic equipment at charging;
a number of applications (APP) opened on the electronic equipment at charging;
a type of an APP opened on the electronic equipment at charging;
a time of charging the electronic equipment;
current power of a CPU of the electronic equipment at charging; or
power consumed for running an APP on the electronic equipment at charging.

5. The charging method of claim 4, further comprising:
determining that the application scene is the first scene in response to that the power consumed is greater than a first power threshold,
determining that the application scene is the second scene in response to that the power consumed is less than a second power threshold, wherein the first power threshold is greater than the second power threshold, and
determining that the application scene is a third scene in response to that the power consumed is between the second power threshold and the first power threshold.

6. The charging method of claim 4, further comprising:
determining that the application scene is the first scene in response to that the time of charging is within a first time period; and
determining that the application scene is the second scene in response to that the time of charging is within a second time period,
wherein a frequency of using the electronic equipment within the first time period is greater than a frequency of using the electronic equipment within the second time period,
wherein a duration of using the electronic equipment within the first time period is greater than a duration of using the electronic equipment within the second time period,
wherein an authorization to operate the electronic equipment within the first time period is greater than an authorization to operate the electronic equipment within the second time period.

7. The charging method of claim 1, wherein charging the electronic equipment based on the target charging mode comprises:
in response to power remaining in the electronic equipment being less than a third power threshold, charging the electronic equipment using constant current according to a constant-current charging parameter corresponding to the target charging mode;
in response to power remaining in the electronic equipment being no less than the third power threshold, charging the electronic equipment using constant voltage according to a constant-voltage charging parameter corresponding to the target charging mode.

8. An electronic equipment, comprising a processor and memory,
wherein the memory is adapted to store instructions executable by the processor,
wherein the processor is adapted to:
determine predetermined information indicating an application scene in charging electronic equipment;
select, from alternative charging modes based on the predetermined information, a target charging mode adapted to the application scene, wherein each of the alternative charging modes corresponds to a distinct charging parameter; and
instruct the electronic equipment to charge based on the target charging mode,
wherein the alternative charging modes comprise a first charging mode and a second charging mode, wherein the application scene comprises a first scene and a second scene,
wherein the processor is adapted to selecting, based on the predetermined information from the alternative charging modes, the target charging mode adapted to the application scene by:
in response to the application scene indicated by the predetermined information being the first scene, selecting the first charging mode as the target charging mode; and
in response to the application scene indicated by the predetermined information being the second scene, selecting the second charging mode as the target charging mode,
wherein the alternative charging modes further comprise a third charging mode, wherein a third charging rate corresponding to the third charging mode is between a first charging rate corresponding to the first charging mode and a second charging rate corresponding to the second charging mode, wherein the application scene further comprises a third scene, wherein a third power consumption demand in the third scene is between a first power consumption demand in the first scene and a second power consumption demand in the second scene,
wherein the processor is adapted to selecting, based on the predetermined information from the alternative charging modes, the target charging mode adapted to the application scene, by:
in response to the application scene indicated by the predetermined information being the third scene, selecting the third charging mode as the target charging mode,
wherein the processor is adapted to:
determining a charging parameter corresponding to the third charging mode according to the first charging mode and a predetermined multiplier, or
determining the charging parameter corresponding to the third charging mode by performing weighted average over a charging parameter corresponding to the first charging mode and a charging parameter corresponding to the second charging mode using a preset weighting coefficient.

9. The electronic equipment of claim 8, wherein a first charging rate corresponding to the first charging mode is greater than a second charging rate corresponding to the second charging mode.

10. The electronic equipment of claim 8, wherein a first current power demand in the first scene is greater than a second current power demand in the second scene.

11. The electronic equipment of claim 8, wherein the predetermined information comprises at least one of following parameters:
power remaining in the electronic equipment at charging;
power consumed by the electronic equipment at charging;
a number of applications (APP) opened on the electronic equipment at charging;
a type of an APP opened on the electronic equipment at charging;
a time of charging the electronic equipment;
current power of a CPU of the electronic equipment at charging; or
power consumed for running an APP on the electronic equipment at charging.

12. The electronic equipment of claim 11, wherein the processor is further adapted to
determine that the application scene is the first scene in response to that the power consumed is greater than a first power threshold;
determine that the application scene is the second scene in response to that the power consumed is less than a second power threshold, wherein the first power threshold is greater than the second power threshold, and
determine that the application scene is a third scene in response to that the power consumed is between the second power threshold and the first power threshold.

13. The electronic equipment of claim 11, wherein the processor is further adapted to
determine that the application scene is the first scene in response to that the time of charging is within a first time period; and
determine that the application scene is the second scene in response to that the time of charging is within a second time period,
wherein a first frequency of using the electronic equipment within the first time period is greater than a second frequency of using the electronic equipment within the second time period,
wherein a first duration of using the electronic equipment within the first time period is greater than a second duration of using the electronic equipment within the second time period,
wherein an authorization to operate the electronic equipment within the first time period is greater than an authorization to operate the electronic equipment within the second time period.

14. The electronic equipment of claim 8, wherein the processor is adapted to,
in response to power remaining in the electronic equipment being less than a third power threshold, instruct the electronic equipment to charge using constant current according to a constant-current charging parameter corresponding to the target charging mode;
in response to power remaining in the electronic equipment being no less than the third power threshold, instruct the electronic equipment to charge using constant voltage according to a constant-voltage charging parameter corresponding to the target charging mode.

15. A non-transitory computer-readable storage medium, having stored thereon an executable program which, when executed by a processor, implements acts comprising:
determining predetermined information indicating an application scene in charging electronic equipment;
selecting, from alternative charging modes based on the predetermined information, a target charging mode adapted to the application scene, wherein each of the alternative charging modes corresponds to a distinct charging parameter; and
charging the electronic equipment based on the target charging mode,
wherein the alternative charging modes comprise a first charging mode and a second charging mode, wherein the application scene comprises a first scene and a second scene,
wherein selecting, based on the predetermined information from the alternative charging modes, the target charging mode adapted to the application scene comprises:
in response to the application scene indicated by the predetermined information being the first scene, selecting the first charging mode as the target charging mode; and
in response to the application scene indicated by the predetermined information being the second scene, selecting the second charging mode as the target charging mode,
wherein the alternative charging modes further comprise a third charging mode, wherein a third charging rate corresponding to the third charging mode is between a first charging rate corresponding to the first charging mode and a second charging rate corresponding to the second charging mode, wherein the application scene further comprises a third scene, wherein a third power consumption demand in the third scene is between a first power consumption demand in the first scene and a second power consumption demand in the second scene,
wherein selecting, based on the predetermined information from the alternative charging modes, the target charging mode adapted to the application scene comprises:
in response to the application scene indicated by the predetermined information being the third scene, selecting the third charging mode as the target charging mode,
wherein the executable program further implements one of following acts:
determining a charging parameter corresponding to the third charging mode according to the first charging mode and a predetermined multiplier, or
determining the charging parameter corresponding to the third charging mode by performing weighted average over a charging parameter corresponding to the first charging mode and a charging parameter corresponding to the second charging mode using a preset weighting coefficient.

* * * * *